United States Patent Office

3,268,563
Patented August 23, 1966

3,268,563
ESTERS OF AN α-SULFO CARBOXYLIC ACID AND A GLYCOL
Kwan-Ting Shen and Patrick M. Quinlan, St. Louis, Mo., assignors to Petrolite Corporation, Wilmington, Del., a corporation of Delaware
No Drawing. Filed May 3, 1962, Ser. No. 192,094
4 Claims. (Cl. 260—400)

This invention relates to oxyalkylated esters of α-sulfocarboxylic acids, for example esters containing a

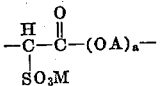

moiety, wherein (OA)$_a$ is derived from one or more alkylene oxides, for example α-β alkylene oxides such as ethylene oxide, propylene oxide, butylene oxide, styrene oxide, etc.; α-γ alkylene oxides such as oxetanes, etc., with the proviso that OA contain at least one hydrophobic oxide (i.e. an oxide other than ethylene oxide) either alone or in combination with ethylene oxide; wherein OA comprises (1) a homo oxyalkylene unit containing only one oxide, (2) a plurality of block oxyalkylene units, (3) a hetero unit containing a mixture of oxides, or (4) at least one hetero and one homo block unit; where $a$ is for example 1–100 or more such as 1–75, but preferably 1–50, and M is hydrogen or a salt moiety. This invention also relates to uses thereof.

The esters of this invention may be expressed by the following formula:

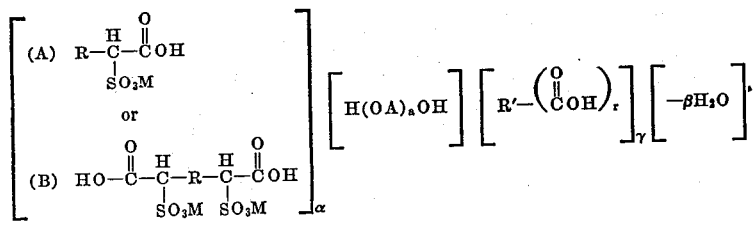

In this formula (OA)$_a$ and M have the same meaning as stated above; R is a hydrocarbon radical, for example, alkyl, alkylene, etc., such as (1) an alkyl group having at least 6 carbon atoms, for example 6–50 or more, advantageously at least 10 carbon atoms, but preferably 14–16 carbons, and (2) an alkylene group having at least 1 carbon atom, for example 1–50 carbons, advantageously 2–35 but preferably 4–10; R' is the moiety of a carboxylic acid, for example alkyl, alkylene, aryl, arylene, alkaryl, aralkyl, cycloalkyl, etc.; α and γ represent the respective moles of each esterified, with being 0 or higher; r is a number representing the carboxylic acid groups, for example 1–3, β represents the moles of water removed during esterification.

The following compounds illustrate this invention.

(1)

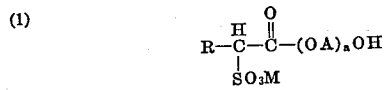

(2)

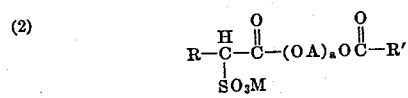

(3)

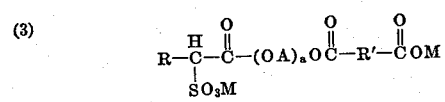

wherein R' in the above as well as other examples in this series is the radical of a carboxylic acid, for example alkyl, alkylene aryl, alkenyl, aralkyl, cycloalkyl, etc.

(4)

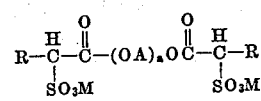

Also included within the scope of this invention are esters of poly (α-sulfo carboxylic acids) for example those of the formula

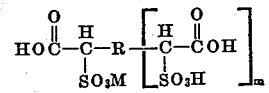

wherein m is an interger, for example 1–2 or more but preferably 1, and R is the moiety of the acid as defined above.

Bis (α-sulfo carboxylic acid) will be used to illustrate the polyacids of this invention.

Where bis (α-sulfocarboxylic acid) is reacted with HO(AO)$_a$H, the following compounds are formed:

(5)

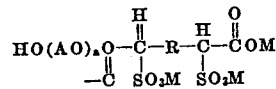

(6)

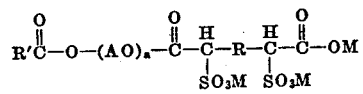

(7)

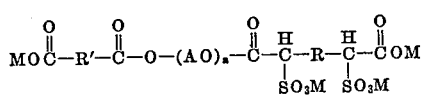

(8)

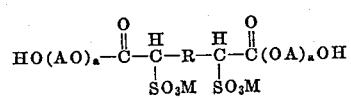

(9)

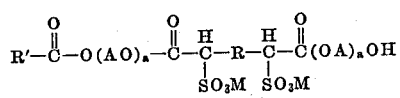

(10)

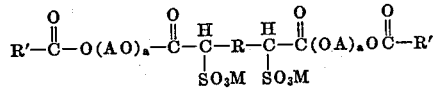

(11) 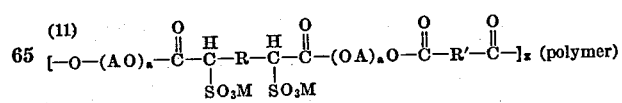 (polymer)

(12) 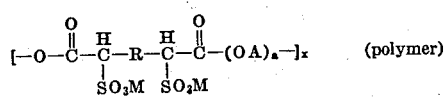 (polymer)

(13)
$$MOOC-R-\overset{H}{\underset{SO_3M}{C}}-\overset{O}{\underset{}{C}}-(OA)_a-O\overset{O}{\underset{}{C}}-\overset{H}{\underset{SO_3M}{C}}-R-\overset{H}{\underset{SO_3M}{C}}-\overset{O}{\underset{}{C}}-OM$$

and others.

The preparation of α-sulfocarboxylic acids is well known to the art. For example they can be prepared by treating acids of the formulae $$CH_3(CH_2)_n\overset{O}{\underset{}{C}}OH$$

or $$HO\overset{O}{\underset{}{C}}-(CH_2)_n-\overset{O}{\underset{}{C}}OH$$

with liquid $SO_3$ to yield products of the formulae:

$$R-\overset{H}{\underset{SO_3M}{C}}-\overset{O}{\underset{}{C}}OH \text{ and } HO\overset{O}{\underset{}{C}}-\overset{H}{\underset{SO_3M}{C}}-R-\overset{H}{\underset{SO_3M}{C}}-\overset{O}{\underset{}{C}}OH$$

$H(OA)_aOH$ is derived from any suitable α,β alkylene oxide, for example, alkylene oxides of the formula $$R^2-\overset{R^1}{\underset{}{C}}\underset{O}{\diagdown}\overset{R^3}{\underset{}{C}}-R^4$$

where $R^1$, $R^2$, $R^3$, $R^4$ are hydrogen or a substituted group, for example alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_a$ denotes (1) homo units for example $$-(OPr)_n-$$

the Pr moiety having its usual meaning $$-CH_2CH-\underset{CH_3}{|}$$

$-(OBu)_n-$, $-(O\,Octyl)_n-$, $$-(O-CHCH_2)_n-\underset{\underset{\bigcirc}{|}}{}$$

etc., (2) block units, $-(OEt)_n(OPr)_m-$, $-(OEt)_n(OBu)_m-$, $(OPr)_n(OEt)_m(OPr)_x$ $(OEt)_n(OPr)_m(OBu)_x$ $(OEt)_n)OCH-CH_2)_m$ (with phenyl group)

etc.

where $n+m+x=a$; (3) hereto units containing groups which are random mixtures of more than one oxide $(OEt-OPr)_n$, $(OPr-OBu)_n$, $(OEt-OBu)_n$, wherein the ratio of each oxide to the other is for example 1–99 to 99–1; (4) hetero-homo units for example $$(EtO)_n(ETO-PrO)_m$$
$$(EtO)_n(PrO)_m(EtO-PrO)_x$$
$$(EtO-PrO)_n(BuO)_m$$

etc.

In addition, derivatives of $(OA)_a$ can be derived from an oxetane (e.g. α-γ alkylene oxide) for example of the formula $$\underset{CH_2\underset{O}{\diagdown}\overset{Z}{\underset{}{C}}\overset{}{\diagup}CH_2}{Y}$$

where Z and Y are hydrogen or a substituted radical for example alkyl, aryl, cycloalkyl, alkenyl, aralkyl, etc.

In addition, Z and Y can be substituted as in cases when the oxetane is derived from pentaerythritol and derivatives thereof. Examples of such oxetanes can be found in the American Chemical Society Monogram, "The Pentaerythritols," by Berlow et al. (Reinhold, 1958) Chapter X. Preferred embodiments of such pentaerythritol derived oxetanes are those of the formula $$\underset{CH_2\underset{O}{\diagdown}\overset{CH_2X}{\underset{}{C}}\overset{}{\diagup}CH_2}{CH_2Y}$$

where X and Y are halogen, cyano, hydroxy and alkoxy.

Many polyalkylene oxide block polymers have been prepared containing definite homogeneous block units or segments of ethylene oxide, propylene oxide, butylene oxide, etc., such as disclosed in U.S. Patents 2,674,619, 2,677,700 and elsewhere.

Where ethylene oxide is reacted with water, a polymeric polyethylene glycol of the type $H(OEt)_n-O-(EtO)_nH$ is formed. Similarly, where propylene oxide is reacted with water, a polymeric polypropylene glycol of the type $H(OPr)_n-O-(PrO)_nH$ is formed. When water is first reacted with ethylene oxide followed by reaction with propylene oxide, a polymer containing blocks of ethylene oxide units and blocks of propylene oxide are formed, $H(OPr)_m(OEt)_nO-(EtO)_n(PrO)_mH$, or when added in the reverse order the following block polymer is formed:

$$H(OEt)_m(OPr)_nO(PrO)_n(EtO)_mH$$

Block polymers of this type can be formed by adding infinite numbers of block units, for example, $$H(OPr)_y(OEt)_x(OPr)_m(OEt)_n-O$$
$$-(EtO)_n(PrO)_m(EtO)_x(PrO)_yH$$

This block-wise or sequential addition could be continued infinitely. When only two types of alkylene oxides are employed, these polymers are di-block polymers.

Where three or more different types of alkylene oxides are employed, ter-block polymers are formed as illustrated by sequentially adding ethylene oxide, propylene oxides, and butylene oxides to water to form:

$$H(OBu)_x(OPr)_m(OEt)_n-O-(EtO)_n(PrO)_m(BuO)_xH$$

These block units may also be continued infinitely. Where, for example, other alkylene oxides are used in addition to ethylene, propylene, and butylene oxides, a higher type of block polymer is formed, such as when octylene oxide or styrene oxide are additionally reacted. It is to be noted the block units of these polymers within themselves are homogeneous units, i.e., each block is derived from a single alkylene oxide.

Polyalkylene oxides have also been prepared by reacting mixtures of alkylene oxide such as when a mixture of ethylene oxide and propylene oxide are reacted. When this is done, a random or hetero-polymer is obtained. Thus, for example, where a 50/50 molar mixture of EtO and PrO is reacted with an oxyalkylatable material, such as water, one obtains a polymer having no orderly arrangement of the alkylene oxide units since the distribution of EtO and PrO units in the molecule is random. It may be designated by

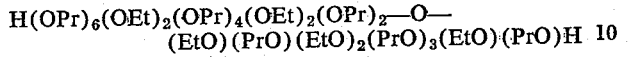

where MO represents a random distribution of EtO and PrO units such as, for example, $H(OPr)_6(OEt)_2(OPr)_4(OEt)_2(OPr)_2$—O—
$(EtO)(PrO)(EtO)_2(PrO)_3(EtO)(PrO)H$ Carbide & Carbon sells these mixed or hetero glycols under the "Ucon" trademark.

Block polymers are sold by Wyandotte under the trademark "Pluronics."

Where the productcs of this invention are block or heteroblock polymers containing blocks or segments of alkylene oxide units which are added sequentially, the reaction is in essence stepwise. For the sake of simplicity of presentation, the invention will be illustrated by employing as a base oxyalkylatable compound $H_2O$ and by employing only ethylene, propylene, and butylene oxides with the understanding that other hydrophobe oxides can be used in place of propylene and butylene oxides such as amylene oxide, octylene oxide, styrene oxide, oxetanes, etc. These are shown in the following table.

The products formed are represented by means of a statistical formula and are often referred to as cogeneric mixtures. This is for the reason that if one selects any oxyalkylatable material and subjects it to oxyalkylation, particularly where the amount of oxide added is comparatively large, for example 30 units of EtO, it is well known that one does not obtain a single constituent such as $RO(C_2H_4O)_{30}H$. Instead one obtains a cogeneric mixture of closely related homologous compounds in which the formula may be shown as the following: $RO(C_2H_4O)_xH$ where $x$ as far as the statistical average goes, is 30, but the individual members present in significant amounts may vary from compounds where $x$ has a value of 25 and perhaps less to a point where $x$ may represent 35 or more (see Flory Chemical Reviews, vol. 39, No. 1, page 137). Thus, the formulae presented herein are statistical formulae.

TABLE I

*Step I:*
(1) $O[(EtO)_nH]_2$
(2) $O[(PrO)_nH]_2$
(3) $O[(BuO)_nH]_2$    hetero
(4) $O[(MO)_nH]_2$    (MO=EtO-PrO mixture)
(5) $O[(PrO—BuO)_nH]_2$

*Step II.*—Reaction of the Step I product with one of the five oxides or mixtures employed in Step I, which oxide had not been reacted in the immediately preceding step. For example:

(6) $O[(EtO)_n(PrO)_mH]_2$
(7) $O[(EtO)_n(BuO)_mH]_2$
(8) $O[(EtO)_n(MO)_mH]_2$
(9) $O[(EtO)_n(PrO—BuO)_mH]_2$
(10) $O[(PrO)_n(EtO)_mH]_2$
(11) $O[(PrO)_n(BuO)_mH]_2$
(12) $O[(PrO)_n(MO)_mH]_2$
(13) $O[(PrO)_n(PrO—BuO)_mH]_2$
(14) $O[(BuO)_n(EtO)_mH]_2$
(15) $O[(BuO)_n(PrO)_mH]_2$
(16) $O[(BuO)_n(MO)_mH]_2$
(17) $O[(BuO)_n(PrO—BuO)_mH]_2$
(18) $O[(MO)_n(EtO)_mH]_2$
(19) $O[(MO)_n(PrO)_mH]_2$
(20) $O[(MO)_n(BuO)_mH]_2$
(21) $O[(MO)_n(PrO—BuO)_mH]_2$
(22) $O[(PrO—BuO)_n(EtO)_mH]_2$
(23) $O[(PrO—BuO)_n(PrO)_mH]_2$
(24) $O[(PrO—BuO)_n(BuO)_mH]_2$
(25) $O[(PrO—BuO)_n(MO)_mH]_2$

*Step III.*—The products of Step II can be reacted with one of the five epoxides or mixture of oxides which had not been reacted in the immediately preceding step, i.e. either EtO, PrO, BuO, MO, or PrO–BuO, with the above exclusion as to the epoxide just reacted. This will be illustrated as follows:

(26) $O[(EtO)_n(PrO)_m(EtO)_xH]_2$
(27) $O[(EtO)_n(PrO)_m(BuO)_xH]_2$
(28) $O[(EtO)_n(PrO)_m(MO)_xH]_2$
(29) $O[(EtO)_n(PrO)_m(PrO)_xH]_2$
(30) $O[(EtO)_n(BuO)_m(EtO)_xH]_2$
(31) $O[(EtO)_n(BuO)_m(PrO)_xH]_2$
(32) $O[(EtO)_n(BuO)_m(MO)_xH]_2$
(33) $O[(EtO)_n(BuO)_m(PrO—BuO)_xH]_2$
(34) $O[(EtO)_n(MO)_m(EtO)_xH]_2$
(35) $O[(EtO)_n(MO)_m(PrO)_xH]_2$
(36) $O[(EtO)_n(MO)_m(BuO)_xH]_2$
(37) $O[(EtO)_n(MO)_m(PrO—BuO)_xH]_2$
(38) $O[(EtO)_n(PrO—BuO)_m(EtO)_xH]_2$
(39) $O[(EtO)_n(PrO—BuO)_m(PrO)_xH]_2$
(40) $O[(EtO)_n(PrO—BuO)_m(BuO)_xH]_2$
(41) $O[(EtO)_n(PrO—BuO)_m(MO)_xH]_2$
(42) $O[(PrO)_n(EtO)_m(PrO)_xH]_2$
(43) $O[(PrO)_n(EtO)_m(BuO)_xH]_2$
(44) $O[(PrO)_n(EtO)_m(MO)_xH]_2$
(45) $O[(PrO)_n(EtO)_m(PrO—BuO)_xH]_2$
(46) $O[(PrO)_n(BuO)_m(EtO)_xH]_2$
(47) $O[(PrO)_n(BuO)_m(PrO)_xH]_2$
(48) $O[(PrO)_n(BuO)_m(MO)_xH]_2$
(49) $O[(PrO)_n(BuO)_m(PrO—BuO)_xH]_2$
(50) $O[(PrO)_n(MO)_m(EtO)_xH]_2$
(51) $O[(PrO)_n(MO)_m(PrO)_xH]_2$
(52) $O[(PrO)_n(MO)_m(BuO)_xH]_2$
(53) $O[(PrO)_n(MO)_m(PrO—BuO)_xH]_2$
(54) $O[(PrO)_n(PrO—BuO)_m(EtO)_xH]_2$
(55) $O[(PrO)_n(PrO)—BuO)_m(PrO)_m(PrO)_xH]_2$
(56) $O[(PrO)_n(PrO—BuO)_m(BuO)_xH]_2$
(57) $O[(PrO)_n(PrO—BuO)_m(MO)_xH]_2$
(58) $O[(BuO)_n(EtO)_m(PrO)_xH]_2$
(59) $O[(BuO)_n(EtO)_m(BuO)_xH]_2$
etc.

Step IV involves the oxyalkalation of the products of Step III. Step V involves the oxyalkalation of Step IV. Further oxyalkalations involve Steps VI–X or higher.

In addition an oxetane can be employed in place of the above hydrophobic alklene oxide. Thus, in the above formula an oxetane may be stubstituted for PrO or BuO in homo units, hetero units, block units, or hetero-block units.

Although the hydroxy compounds described above are oxygen-containing compounds, corresponding compounds can be formed from hydrogen sulfide. In addition, sulfur analogues of the alkylene oxides can also be employed. Thus, $H_2O$ or $H_2S$, can be oxyalkylated with alkylene oxide, alkylene sulfide, or mixtures of alkylene oxides and alkylene sulfide in a random or block-wise fashion. The following compounds are exemplary:

$\phi[—CH_2—CH_2S—]_zH$ $\phi[—\overset{CH_3}{\underset{|}{C}H_2}—CH_2S—]_zH$ $\phi[(—CH_2—CH_2S)_n(CH_2—CH_2O)_m—]_zH$ $\phi[(CH_2—CH_2O)_n(CH_2—CH_2S)_m—]_zH$ $\phi\begin{bmatrix}—(CH_2CH_2—O)—\\—(CH_2CH_2—S)—\\(\text{mixed})\end{bmatrix}_zH$ $\phi=O,S$ The following are non-limiting examples of carboxylic acids corresponding to

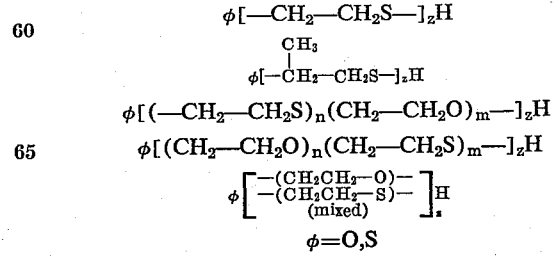

which can be employed herein.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myriatic, pentadecanoic, palmitic, heptadecanoic, stearic, nonadecanoic eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyelcosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyl-dicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the hydroxy compound will depend on the number of acetylation reactive positions contained therein as well as the number of moles one wishes to incorporate into the molecule.

M designates H or the cationic moiety of a sulfonate salt. The salts of the sulpho-carboxylic acid esters which may be produced by our invention are many and varied. In general, salts of most inorganic and organic bases may be prepared. Among the inorganic salts are the alkali metal and alkaline earth salts, such as the sodium, potassium, calcium and magensium salts as well as the salts of heavy metals. Ammonium and substituted ammonium or organic nitrogenous base salts may also be prepared, included within this class are, for example, the salts of alcohol amines including monoethanolamine, diethanolamine, triethanolamine, propanolamines, butanolamines, pentanolamines, glycerolamines, dimethyl monoethanolamine, diethyl monoethanolamine, dibutyl monoethanolamine, diethanol ethyl amine, cyclohexyl ethanolamine, alkylol polyamines such as alkylol derivatives of ethylene diamine, mono-methyl mono-ethanolamine, diethyl monoethanolamine, 1-amino-2, 3-propanediol, 1,2-diaminopropanol; alkylamines such as butylamine, diethylamine, ethylene diamine, diethylene triamine, triethylene tetraamine, mono-methyl ethylene diamine, monoethyl diethylene tetra-amine, hydrazine and substituted hydrazines, aromatic and heterocyclic bases and cyclic nitrogenous substances such as pyridine, quinaldine, piperidine, methylpyridine, and homologues and derivatives thereof, and, in general, primary, secondary and tertiary amines substituted or not with other radicals such as hydroxy, alkyl, aryl, cyclo-alkyl groups and the like; quaternary ammonium bases or hydroxides such as tetra-methyl ammonium hydroxide, tetraethyl ammonium hydroxide, quaternary ammonium bases with dissimilar alkyl radicals such as methyltriethyl ammonium hydroxide, propyltrimethyl ammonium hydroxide, mixtures of any two or more thereof, and the like. It will be understood that these organic nitrogenous bases may be employed in pure, impure or commercial form such as, for example, commercial triethanolamine which contains minor proportions of mono- and di-ethanolamine. The tabulation of specific salts given hereinabove is by no means meant to be exhaustive, but it affords to those skilled in the art more than an adequate exemplification of the practice of our invention.

In certain fields of utility other salts can also be employed. For example, calcium, barium, zinc, strontium, aluminum, chromium, nickel and other polyvalent metal salts which are soluble in hydrocarbons may be used as oil soluble detergents. They are useful, for example, in turbine oils and in lube oils of the type used in the crank cases of internal combustion engines. For this purpose they are ordinarily added to the oils in amounts of about 0.1% to about 5% by weight.

In addition to their utility as wetting agents and detergents certain salts may be employed for special purposes. For example, copper, cadmium and mercury salts may be applied as mildew-proofing agents, for example in cellulosic textiles. Amine and quaternary ammonium salts may be applied as moth proofing agents for woolens.

Although various meanings have been assigned in the above formulae, the best combinations thereof will depend on the particular application to which the composition is applied. For example, R and R' can be selected so as to yield the desired oil or water solubility, or the type and amount of (OA)$_a$ can vary the solubility which has already been imparted by R and R'. In certain systems it may be desirable to employ the composition as the free sulfonic acid while in others it may be desirable to employ it in the form of salt. Therefore, specific composition variations will depend on the particular system in which it is employed.

The sulfo esters of this invention may be prepared by any conventional method, for example heat alone, heat and reduced pressure, heat in combination with an azeotroping agent, etc. are all satisfactory. In addition, esters can be prepared by adding the alkylene oxide directly to the carboxylic acid to form the ester:

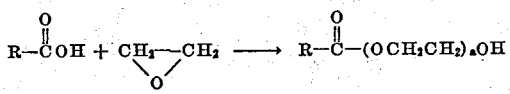

It is noted that no water is given off by this method of esterification. However, in Table II, no matter how prepared, the ester will be considered as being derived from the glycol and a mole of water will be considered as removed from each ester group. Therefore, a compound of the formula

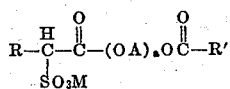

2 moles of water would be removed, (i.e. [—2H$_2$O]) whether made by esterifying the glycol or by reaction with an alkylene oxide (i.e. —$\beta$H$_2$O indicates the moles of H$_2$O removed).

The following examples are presented by way of illustration and not of limitation.

*Example 1*

Into a 500 ml. resin pot fitted with a stirrer, Dean-Stark water trap, and reflux condenser were introduced 304 g. (0.2 M) of the mono-acetate ester of a polyalkylene glycol containing 20 moles of ethylene oxide and 10 moles of propylene oxide, 68 g. (0.2 M) of α-sulfopalmitic

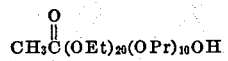

acid, and 150 ml. of benzene. The mixture was stirred and heated at reflux temperature until the theoretical amount of water of esterification was removed (about 3.6 ml.). After the reaction was completed, as checked by infrared spectra, the benzene was removed by heating the mixture in vacuo.

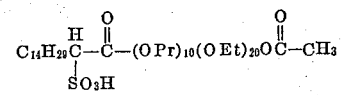

*Example 4*

Into a 500 ml. resin pot fitted with a stirrer, Dean-Stark water trap, and reflux condenser were introduced 209 g. (0.2 mole) of the mono-acetate ester of polypropylene glycol

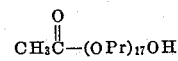

obtained from the reaction product of polypropylene glycol of approximate molecular weight 1000 and acetic acid, 68 g. (0.2 M) of α-sulfopalmitic acid, and 150 ml. of benzene. The mixture was stirred and heated at reflux temperature until the theoretical amount of water of esterification was removed (about 3.6 ml.). After the reaction was completed, (as checked by infrared spectra), the benzene was removed by heating the mixture in vacuo. The product is

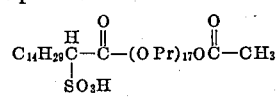

*Example 6*

Into a 500 ml. resin pot fitted with a stirrer, Dean-Stark water trap, and reflux condenser were introduced 418 g. (0.2 M) of the mono-acetate ester of polypropylene glycol

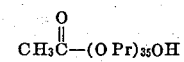

obtained from the reaction product of polypropylene glycol, approximate molecular weight 2000 and acetic acid, 72.6 g. (0.2 M) of α-sulfo-stearic acid, and 150 ml. of benzene. The mixture was stirred and heated at reflux temperature until the theoretical amount of water of esterification was removed (about 3.6 ml.). After the reaction was completed, (as checked by infrared spectra), the benzene was removed by heating the mixture in vacuo. The product is

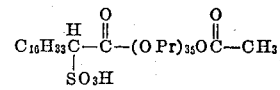

*Example 9*

Into a 500 ml. resin pot fitted with a stirrer, Dean-Stark water trap, and reflux condenser were introduced 418 g. (0.4 M) of the mono-acetate ester of polypropylene glycol

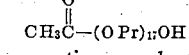

obtained from the reaction product of polypropylene glycol of approximate molecular weight 1000 and acetic acid, 72.5 g. (0.2 M) of α-α'-disulfosebacic acid, and 150 ml. of benzene. The mixture was stirred and heated at reflux temperature until the theoretical amount of water of esterification was removed (about 7.2 ml.). After the reaction was completed (as checked by infrared spectra), the benzene was removed by heating the mixture in vacuo. The product is

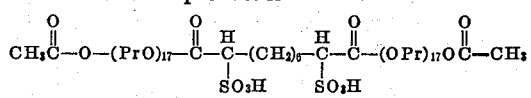

In the above examples and in the following table the order of alkylene oxides therein indicate that the glycols were prepared by first adding the first listed oxide and then adding the second listed oxide. Thus, the glycol of Example 1 (EtO 20) (PrO 10) was prepared by first adding 20 moles of EtO and then 10 moles of PrO to 1 mole of water.

TABLE I

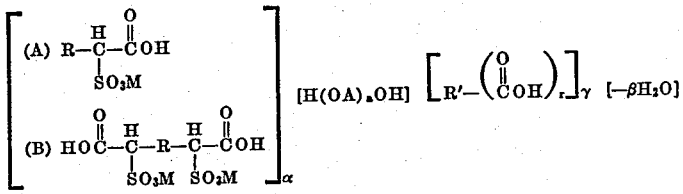

$$\left[\begin{array}{l}\text{(A)} \ R-\overset{H}{\underset{SO_3M}{C}}-\overset{O}{\underset{}{C}}OH \\ \text{(B)} \ HO\overset{O}{C}-\overset{H}{\underset{SO_3M}{C}}-R-\overset{H}{\underset{SO_3M}{C}}-\overset{O}{C}OH\end{array}\right]_\alpha [H(OA)_nOH]\left[R'-\left(\overset{O}{\underset{}{C}}OH\right)_r\right]_\gamma [-\beta H_2O]$$

| Ex. | Sulfo Acid | | | | Glycol | | Acid | | | H₂O |
|---|---|---|---|---|---|---|---|---|---|---|
| | Letter | R | M | α | OA | Moles | R' | r | | γ |
| 1 | A | $C_{14}H_{29}$ | H | 1 | EtO / PrO | 20 / 10 | $CH_3-$ | 1 | 1 | 2 |
| 2 | A | $C_{16}H_{33}$ | H | 1 | EtO / PrO | 20 / 5 | $C_{11}H_{23}$ | 1 | 1 | 2 |
| 3 | A | $C_{16}H_{33}$ | Ca | 1 | EtO / PrO / BuO | 10 / 5 / 2 | $C_3H_7$ | 1 | 1 | 2 |
| 4 | A | $C_{14}H_{29}$ | H | 1 | PrO | 17 | $CH_3-$ | 1 | 1 | 2 |
| 5 | A | $C_{14}H_{29}$ | K | 1 | BuO | 6 | $C_2H_5$ | 1 | 1 | 2 |
| 6 | A | $C_{16}H_{33}$ | H | 1 | PrO | 35 | $CH_3-$ | 1 | 1 | 2 |
| 7 | B | $-(CH_2)_2-$ | H | 1 | PrO | 5 | $C_{17}H_{33}$ | 1 | 1 | 2 |
| 8 | B | $-(CH_2)_6-$ | H | ½ | EtO / PrO | 15 / 5 | $C_{17}H_{35}$ | 1 | 2 | 2 |
| 9 | B | $-(CH_2)_6-$ | H | ½ | PrO | 17 | $CH_3-$ | 1 | 2 | 2 |
| 10 | A | $C_{14}H_{29}$ | H | 2 | PrO | 35 | | | 0 | 2 |
| 11 | A | $C_{16}H_{33}$ | H | 1 | EtO / $-CH_2\overset{CH_3}{\underset{CH_3}{C}}-CH_2-O-$ | 10 / 5 | $C_3H_7-$ | 1 | 1 | 2 |
| 12 | A | $C_{10}H_{21}$ | H | 2 | PrO | 30 | | | 0 | 2 |
| 13 | A | $C_{16}H_{33}$ | H | 1 | $-CH_2\overset{CH_3}{\underset{CH_3}{C}}CH_2O$ | 8 | $CH_3-$ | 1 | 1 | 2 |
| 14 | A | $C_{14}H_{29}$ | H | 2 | PrO | 40 | $-(CH_2)_4-$ | 2 | ½ | 3 |
| 15 | A | $C_{14}H_{29}$ | Na | 1 | PrO / EtO | 5 / 10 | $CH_3-$ | 1 | 1 | 2 |
| 16 | A | $C_{16}H_{33}$ | $NH_4$ | 1 | $CH_2\overset{CH_2-Cl}{\underset{CH_2Cl}{-C}}-CH_2-O$ | 3 | $C_2H_5-$ | 1 | 1 | 2 |
| 17 | A | $C_{16}H_{33}$ | $H\left(CH_2-\overset{CH_3}{\underset{CH_3}{C}}-\right)_2 NH_2$ * | 1 | PrO | 50 | $CH_3-$ | 1 | 1 | 2 |
| 18 | A | $C_{16}H_{33}$ | $\overset{\oplus}{NH_2}$—O (morpholine) | 1 | PrO | 8 | $CH_3-$ | 1 | 1 | 2 |
| 19 | A | $C_{16}H_{33}$ | $\begin{array}{c}CH-CH_2\\N\underset{C_{17}H_{33}}{=}C-\overset{\oplus}{N}-CH_2CH_2NH_2\end{array}$ | 1 | $-CH_2CH-O-$ (phenyl) | 1 | $CH_3-$ | 1 | 1 | 2 |
| 20 | A | $C_{16}H_{33}$ | $\overset{\oplus}{NH_2}-(CH_2CH_2OH)_2$ | 1 | $-CH_2CH-O-(CH_2)_5-CH_3$ | 2 | | | 0 | 2 |
| 21 | A | $C_{16}H_{33}$ | $\overset{\oplus}{H_3N}-(CH_2CH_2\overset{H}{N})_2-H$ | 1 | PrO | 30 | $CH_3-$ | 1 | 1 | 2 |
| 22 | B | $-C_4H_8-$ | Na | ½ | BuO / EtO | 40 / 15 | $-CH_2-O-CH_2-$ | 2 | 1 | 2 |
| 23 | A | $C_8H_{17}$ | $\overset{\oplus}{HN}\overset{CH_3}{\underset{C_{12}H_{25}}{-}}CH_3$ | 1 | PrO / EtO | 30 / 15 | $C_{17}H_{33}$ | 1 | 1 | 2 |

*Other tertiary amine of this type (Primenes) $CH_2\left(=\overset{CH_3}{\underset{CH_3}{C}}-CH_2\right)_x\overset{CH_3}{\underset{CH_3}{C}}-NH_2$ can be employed.

USES

The products obtained by this process are valuable anionic surface active agents and have many varied commercial uses. The most conspicuous property of these products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions or fine stable dispersions; for dyeing; for the pasting of dyestuffs; for fulling, sizing, impregnating and bleaching treatments; as cleansing agents in hard water; in tanning and mordanting processes; for dyeing acetate with insoluble dyestuffs; for the preparation of dyestuffs in finely divided form; for dispersible dye powders; for producing foam for fire extinguishers; as a means for improving the absorptive power of fibrous bodies; and as an aid in softening hides and skins.

In addition, these products are valuable emulsifiers for insecticidal compositions and agricultural sprays such as DDT, 2,4-D, toxaphene, chlordane, dormant or mineral oil sprays, nicotine sulfate, methoxychlor, etc. and are effective dispersants for pesticidal powders, such as those containing the above toxicants. They are valuable emulsifiers for herbicides, etc.

These products are also valuable for use as additives to petroleum products, such as fuel oils, lubricating oils, greases, and as additives to the water or brines used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement; additives to asphalt compositions; plasticizers and modifiers for vinyl plastics, alkyl resins, phenol-formaldehyde resins and other types of polymeric-type plastic materials; for incorporation into adhesives, paints, linoleum, for use in bonding agents used in various insulating and building materials; as refining aids in wood digesters to prepare pulp; as additives to pulp slurries in beating operations to prevent foaming and also to aid the beating operation in paper-making; and as aids in the preparation of viscose dope.

The products are also useful as emulsifiers for emulsion polymerization, as mercerizing assistants, wetting agents, rewetting agents, dispersing agents, detergents, penetrating agents, softening agents, lime soaps dispersants, dishwashing agents, anti-static agents, disinfectants, insecticides, mothproofing agents bactericides, fungicides and biocides. They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The products are especially useful alone or in combination with other demulsifiers in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in petroleum refining process.

They are useful as corrosion inhibitors, as rust inhibitors, in the protection of metals especially ferrous metals, in acid pickling baths, in acid cleaning compositions, and in electroplating baths. Other valuable uses are as solvents or in solvent compositions, as cleaning agents for paint brushes, as additives for paints, lacquers, and varnishes; as lubricants, as greases and stuffing agents.

The products may be employed in the preparation of skin creams, lotions, salves and other cosmetic preparations such as home hair-wave sets, shaving creams, shampoos, toothpastes, etc. They may also be employed in food products, as foaming agents, emulsifying agents, and softening agents.

They may be used as aids in conditioning of soil; as aids in the grinding, milling or cutting of metals either in aqueous solution, emulsions or in oils, as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; and as curing aids and penetrants for use in fertilizer.

Having thus described our invention, what we claim as new and desire to obtain by Letters Patent is:

1. A compound having the formula

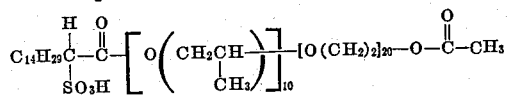

2. A compound having the formula

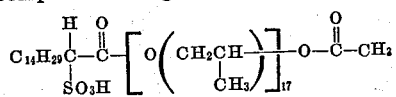

3. A compound having the formula

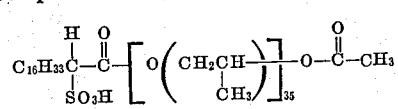

4. A compound having the formula

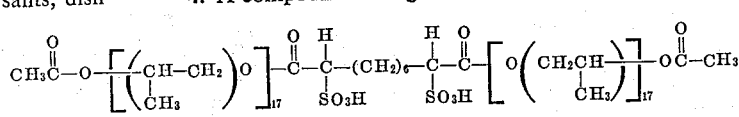

References Cited by the Examiner

UNITED STATES PATENTS

| | | | |
|---|---|---|---|
| 2,460,968 | 2/1949 | Bert et al. | 260—400 |
| 2,602,055 | 7/1952 | De Groote | 260—481 |
| 2,602,058 | 7/1952 | De Groote | 260—481 |

CHARLES B. PARKER, *Primary Examiner.*

DANIEL D. HORWITZ, A. H. SUTTO, *Examiners.*